United States Patent
Pani

(10) Patent No.: US 11,625,154 B2
(45) Date of Patent: Apr. 11, 2023

(54) STAGE UPGRADE OF IMAGE VERSIONS ON DEVICES IN A CLUSTER

(71) Applicant: Cisco Technology, Inc., San Jose, CA (US)

(72) Inventor: Ayaskant Pani, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 406 days.

(21) Appl. No.: 16/833,305

(22) Filed: Mar. 27, 2020

(65) Prior Publication Data

US 2020/0293180 A1   Sep. 17, 2020

Related U.S. Application Data

(63) Continuation of application No. 14/477,812, filed on Sep. 4, 2014, now Pat. No. 10,606,454.

(Continued)

(51) Int. Cl.
*G06F 3/04842* (2022.01)
*H04L 45/00* (2022.01)
(Continued)

(52) U.S. Cl.
CPC ........ *G06F 3/04842* (2013.01); *H04L 41/082* (2013.01); *H04L 41/0836* (2013.01);
(Continued)

(58) Field of Classification Search
CPC .... G06F 3/04842; G06F 9/4418; G06F 9/442; G06F 9/445; G06F 8/65; G06F 9/44;
(Continued)

(56) References Cited

U.S. PATENT DOCUMENTS

| | | | |
|---|---|---|---|
| 4,298,770 A | 11/1981 | Nishihara et al. | |
| 4,636,919 A | 1/1987 | Itakura et al. | |

(Continued)

FOREIGN PATENT DOCUMENTS

| | | |
|---|---|---|
| WO | WO 2003/067799 | 8/2003 |
| WO | 2014071996 A1 | 5/2014 |

OTHER PUBLICATIONS

New methods to color the vertices of a graph, by Brelaz, published Apr. 1979 (Year: 1979).*

(Continued)

*Primary Examiner* — Nishant Divecha
(74) *Attorney, Agent, or Firm* — Polsinelli

(57) ABSTRACT

Systems, methods, and non-transitory computer-readable storage media for stage upgrades in a network. The system generates graph-data structured based representations of devices in the network, wherein respective attributes of the representations is selected based on respective services provided by the devices to tenants in the network and identities of respective tenants serviced by the devices. Next, the system generates a graph showing a distribution of the devices in the network according to the representations, wherein the representations are interconnected in the graph based on service roles of associated devices with respect to tenants in the network and other devices associated with the tenants. The system then schedules an upgrade of devices based on the graph, the upgrade being scheduled in stages, each stage including devices selected for upgrade in that stage, wherein the devices for each stage are selected by identifying devices having respective representations assigned to that specific stage.

17 Claims, 9 Drawing Sheets

Related U.S. Application Data

(60) Provisional application No. 61/900,359, filed on Nov. 5, 2013.

(51) Int. Cl.

| | | |
|---|---|---|
| *H04L 41/0823* | (2022.01) | |
| *H04L 41/0893* | (2022.01) | |
| *H04L 41/12* | (2022.01) | |
| *H04L 41/082* | (2022.01) | |
| *H04L 49/60* | (2022.01) | |
| *H04L 41/5054* | (2022.01) | |
| *H04L 41/22* | (2022.01) | |

(52) U.S. Cl.
CPC .......... *H04L 41/0893* (2013.01); *H04L 41/12* (2013.01); *H04L 41/5054* (2013.01); *H04L 45/563* (2013.01); *H04L 41/22* (2013.01); *H04L 49/604* (2013.01)

(58) Field of Classification Search
CPC ............... H04L 41/082; H04L 41/0836; H04L 41/0893; H04L 41/12; H04L 41/5054; H04L 45/563; H04L 41/22; H04L 49/604; H04L 2101/604; H04L 12/4633; H04L 61/5007; H04L 61/103; H04L 63/104
See application file for complete search history.

(56) References Cited

U.S. PATENT DOCUMENTS

| | | |
|---|---|---|
| 4,700,016 A | 10/1987 | Hitchcock et al. |
| 5,115,431 A | 5/1992 | Williams et al. |
| 5,859,835 A | 1/1999 | Varma et al. |
| 5,926,458 A | 7/1999 | Yin et al. |
| 6,252,876 B1 | 6/2001 | Brueckheimer et al. |
| 6,389,031 B1 | 5/2002 | Chao et al. |
| 6,456,624 B1 | 9/2002 | Eccles et al. |
| 6,650,640 B1 | 11/2003 | Muller et al. |
| 6,677,831 B1 | 1/2004 | Cheng et al. |
| 6,714,553 B1 | 3/2004 | Poole et al. |
| 6,757,897 B1 | 6/2004 | Shi et al. |
| 6,876,952 B1 | 4/2005 | Kappler et al. |
| 6,907,039 B2 | 6/2005 | Shen |
| 6,941,649 B2 | 9/2005 | Goergen |
| 6,952,421 B1 | 10/2005 | Slater |
| 6,954,463 B1 | 10/2005 | Ma et al. |
| 6,996,099 B1 | 2/2006 | Kadambi et al. |
| 7,068,667 B2 | 6/2006 | Foster et al. |
| 7,152,117 B1 | 12/2006 | Stapp et al. |
| 7,177,946 B1 | 2/2007 | Kaluve et al. |
| 7,372,857 B1 | 5/2008 | Kappler et al. |
| 7,411,915 B1 | 8/2008 | Spain et al. |
| 7,426,604 B1 | 9/2008 | Rygh et al. |
| 7,516,211 B1 | 4/2009 | Gourlay et al. |
| 7,539,131 B2 | 5/2009 | Shen |
| 7,580,409 B1 | 8/2009 | Swenson et al. |
| 7,630,368 B2 | 12/2009 | Tripathi et al. |
| 7,729,296 B1 | 6/2010 | Choudhary |
| 7,826,400 B2 | 11/2010 | Sakauchi |
| 7,826,469 B1 | 11/2010 | Li et al. |
| 7,848,340 B2 | 12/2010 | Sakauchi et al. |
| 8,233,384 B2 | 7/2012 | Osterhout et al. |
| 8,302,301 B2 | 11/2012 | Lau |
| 8,325,459 B2 | 12/2012 | Mutnury et al. |
| 8,339,973 B1 | 12/2012 | Pichumani et al. |
| 8,378,223 B1 | 2/2013 | Shiue et al. |
| 8,442,063 B1 | 5/2013 | Zhou et al. |
| 8,514,712 B1 | 8/2013 | Aswadhati |
| 8,687,629 B1 | 4/2014 | Kompella et al. |
| 8,782,632 B1 * | 7/2014 | Chigurapati .......... H04L 41/082 717/172 |
| 8,854,972 B1 | 10/2014 | Li |
| 8,868,766 B1 | 10/2014 | Theimer et al. |
| 8,908,691 B2 | 12/2014 | Biswas et al. |
| 9,036,481 B1 | 5/2015 | White |
| 9,106,508 B2 | 8/2015 | Banavalikar et al. |
| 9,178,715 B2 | 11/2015 | Jain et al. |
| 9,197,551 B2 | 11/2015 | DeCusatis et al. |
| 9,203,188 B1 | 12/2015 | Siechen et al. |
| 9,245,626 B2 | 1/2016 | Fingerhut et al. |
| 9,258,195 B1 | 2/2016 | Pendleton et al. |
| 9,325,524 B2 | 4/2016 | Banavalikar et al. |
| 9,374,294 B1 | 6/2016 | Pani |
| 9,402,470 B2 | 8/2016 | Shen et al. |
| 9,407,501 B2 | 8/2016 | Yadav et al. |
| 9,426,060 B2 | 8/2016 | Dixon et al. |
| 9,433,081 B1 | 8/2016 | Xiong et al. |
| 9,444,634 B2 | 9/2016 | Pani |
| 9,502,111 B2 | 11/2016 | Dharmapurikar et al. |
| 9,509,092 B2 | 11/2016 | Shen et al. |
| 9,544,185 B1 | 1/2017 | Yadav et al. |
| 9,544,224 B2 | 1/2017 | Chu et al. |
| 9,590,914 B2 | 3/2017 | Attar et al. |
| 9,627,063 B2 | 4/2017 | Dharmapurikar et al. |
| 9,634,846 B2 | 4/2017 | Pani |
| 9,635,937 B2 | 5/2017 | Shen et al. |
| 9,654,300 B2 | 5/2017 | Pani |
| 9,654,385 B2 | 5/2017 | Chu et al. |
| 9,654,409 B2 | 5/2017 | Yadav et al. |
| 9,655,232 B2 | 5/2017 | Saxena et al. |
| 9,667,431 B2 | 5/2017 | Pani |
| 9,667,551 B2 | 5/2017 | Edsall et al. |
| 9,674,086 B2 | 6/2017 | Ma et al. |
| 9,686,180 B2 | 6/2017 | Chu et al. |
| 9,698,994 B2 | 7/2017 | Pani |
| 9,716,665 B2 | 7/2017 | Attar et al. |
| 9,742,673 B2 | 8/2017 | Banerjee et al. |
| 9,755,965 B1 | 9/2017 | Yadav et al. |
| 9,769,078 B2 | 9/2017 | Attar et al. |
| 9,876,715 B2 | 1/2018 | Edsall et al. |
| 2002/0126671 A1 | 9/2002 | Ellis et al. |
| 2002/0136268 A1 | 9/2002 | Gan et al. |
| 2002/0146026 A1 | 10/2002 | Unitt et al. |
| 2003/0035385 A1 | 2/2003 | Walsh et al. |
| 2003/0058837 A1 | 3/2003 | Denney et al. |
| 2003/0058860 A1 | 3/2003 | Kunze et al. |
| 2003/0067912 A1 | 4/2003 | Mead et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0120884 A1 | 6/2003 | Koob et al. |
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0031030 A1 | 2/2004 | Kidder et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0010685 A1 | 1/2005 | Ramnath et al. |
| 2005/0013280 A1 | 1/2005 | Buddhikot et al. |
| 2005/0073958 A1 | 4/2005 | Atlas et al. |
| 2005/0083835 A1 | 4/2005 | Prairie et al. |
| 2005/0091239 A1 | 4/2005 | Ward et al. |
| 2005/0117593 A1 | 6/2005 | Shand |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2005/0240745 A1 | 10/2005 | Iyer et al. |
| 2006/0013143 A1 | 1/2006 | Yasuie et al. |
| 2006/0028285 A1 | 2/2006 | Jang et al. |
| 2006/0031643 A1 | 2/2006 | Figueira |
| 2006/0039364 A1 | 2/2006 | Wright |
| 2006/0072461 A1 | 4/2006 | Luong et al. |
| 2006/0075093 A1 | 4/2006 | Frattura et al. |

(56) References Cited

U.S. PATENT DOCUMENTS

| | | |
|---|---|---|
| 2006/0083179 A1 | 4/2006 | Mitchell |
| 2006/0083256 A1 | 4/2006 | Mitchell |
| 2006/0182036 A1 | 8/2006 | Sasagawa et al. |
| 2006/0193332 A1 | 8/2006 | Qian et al. |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0221950 A1 | 10/2006 | Heer |
| 2006/0227790 A1 | 10/2006 | Yeung et al. |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274647 A1 | 12/2006 | Wang et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0047463 A1 | 3/2007 | Jarvis et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0159987 A1 | 7/2007 | Khan et al. |
| 2007/0160073 A1 | 7/2007 | Toumura et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0211625 A1 | 9/2007 | Liu et al. |
| 2007/0217415 A1 | 9/2007 | Wijnands et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0263587 A1* | 11/2007 | Savoor ............... H04L 41/5019 370/346 |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0123559 A1 | 5/2008 | Haviv et al. |
| 2008/0147830 A1 | 6/2008 | Ridgill et al. |
| 2008/0151821 A1* | 6/2008 | Cho ..................... H04W 16/10 370/437 |
| 2008/0151863 A1 | 6/2008 | Lawrence et al. |
| 2008/0177896 A1 | 7/2008 | Quinn et al. |
| 2008/0212496 A1 | 9/2008 | Zou |
| 2008/0219173 A1 | 9/2008 | Yoshida et al. |
| 2008/0225853 A1 | 9/2008 | Melman et al. |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0067322 A1 | 3/2009 | Shand et al. |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0161567 A1 | 6/2009 | Jayawardena et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238196 A1 | 9/2009 | Ukita et al. |
| 2009/0268614 A1 | 10/2009 | Tay et al. |
| 2009/0271508 A1 | 10/2009 | Sommers et al. |
| 2010/0020719 A1 | 1/2010 | Chu et al. |
| 2010/0020726 A1 | 1/2010 | Chu et al. |
| 2010/0128619 A1 | 5/2010 | Shigei |
| 2010/0150155 A1 | 6/2010 | Napierala |
| 2010/0161787 A1 | 6/2010 | Jones |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2011/0022725 A1 | 1/2011 | Farkas |
| 2011/0110241 A1 | 5/2011 | Atkinson et al. |
| 2011/0110587 A1 | 5/2011 | Banner |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0203834 A1 | 8/2011 | Yoneya et al. |
| 2011/0228795 A1 | 9/2011 | Agrawal et al. |
| 2011/0239189 A1 | 9/2011 | Attalla |
| 2011/0243136 A1 | 10/2011 | Raman et al. |
| 2011/0249682 A1 | 10/2011 | Kean et al. |
| 2011/0268118 A1 | 11/2011 | Schlansker et al. |
| 2011/0273987 A1 | 11/2011 | Schlansker et al. |
| 2011/0280572 A1 | 11/2011 | Vobbilisetty et al. |
| 2011/0286447 A1 | 11/2011 | Liu |
| 2011/0292886 A1* | 12/2011 | Lee ....................... H04W 16/04 370/329 |
| 2011/0299406 A1 | 12/2011 | Vobbilisetty et al. |
| 2011/0310738 A1 | 12/2011 | Lee et al. |
| 2011/0321031 A1* | 12/2011 | Dournov ............. G06F 9/45533 717/171 |
| 2012/0007688 A1 | 1/2012 | Zhou et al. |
| 2012/0030150 A1 | 2/2012 | McAuley et al. |
| 2012/0030666 A1 | 2/2012 | Laicher et al. |
| 2012/0057505 A1 | 3/2012 | Xue |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163396 A1 | 6/2012 | Cheng et al. |
| 2012/0167013 A1 | 6/2012 | Kaiser et al. |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300669 A1 | 11/2012 | Zahavi |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0064246 A1 | 3/2013 | Dharmapurikar et al. |
| 2013/0090014 A1 | 4/2013 | Champion |
| 2013/0097335 A1 | 4/2013 | Jiang et al. |
| 2013/0124708 A1 | 5/2013 | Lee et al. |
| 2013/0151681 A1 | 6/2013 | Dournov et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227108 A1 | 8/2013 | Dunbar et al. |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |

(56) References Cited

U.S. PATENT DOCUMENTS

| | | |
|---|---|---|
| 2014/0056298 A1 | 2/2014 | Vobbilisetty et al. |
| 2014/0064281 A1 | 3/2014 | Basso et al. |
| 2014/0068750 A1 | 3/2014 | Tjahjono et al. |
| 2014/0086097 A1 | 3/2014 | Qu et al. |
| 2014/0086253 A1 | 3/2014 | Yong et al. |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0108489 A1 | 4/2014 | Glines et al. |
| 2014/0146817 A1 | 5/2014 | Zhang |
| 2014/0146824 A1 | 5/2014 | Angst et al. |
| 2014/0149819 A1 | 5/2014 | Lu et al. |
| 2014/0185348 A1 | 7/2014 | Vattikonda et al. |
| 2014/0185349 A1 | 7/2014 | Terzioglu et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269705 A1 | 9/2014 | DeCusatis et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0016277 A1 | 1/2015 | Smith et al. |
| 2015/0052298 A1 | 2/2015 | Brand et al. |
| 2015/0092551 A1 | 4/2015 | Moisand et al. |
| 2015/0092593 A1 | 4/2015 | Kompella |
| 2015/0113143 A1 | 4/2015 | Stuart et al. |
| 2015/0124611 A1 | 5/2015 | Attar et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124817 A1 | 5/2015 | Merchant et al. |
| 2015/0124821 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124826 A1 | 5/2015 | Edsall et al. |
| 2015/0124833 A1 | 5/2015 | Ma et al. |
| 2015/0127797 A1 | 5/2015 | Attar et al. |
| 2015/0188771 A1 | 7/2015 | Allan et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0036697 A1 | 2/2016 | DeCusatis et al. |
| 2016/0119204 A1 | 4/2016 | Murasato |
| 2016/0315811 A1 | 10/2016 | Yadav et al. |
| 2017/0085469 A1 | 3/2017 | Chu et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |
| 2017/0346748 A1 | 11/2017 | Attar et al. |

OTHER PUBLICATIONS

Torkestani, J. A., & Meybodi, M. R. (2012). A new vertex coloring algorithm based on variable action-set learning automata. Computing and Informatics, 29(3), 447-466. (Year: 2012).

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Author Unknown, "Subset—Wikipedia, the free encyclopedia," Dec. 25, 2014, pp. 1-3.

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf.org/html/draft-mahalingam-dutt-dcops-vxlan-06, Oct. 2013, pp. 1-24.

Moncaster, T., et al., "The Need for Congestion Exposure in the Internet", Oct. 26, 2009, Internet—Draft, pp. 1-22.

Narten, T., et al., "Problem Statement: Overlays For Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

Whitaker et al., "Forwarding Without Loops in Icarus," IEEE OPENARCH 2002, pp. 63-75.

Zhang, Junjie, et al., "Optimizing Network Performance using Weighted Multipath Routing," Aug. 27, 2012, 7 pages.

* cited by examiner

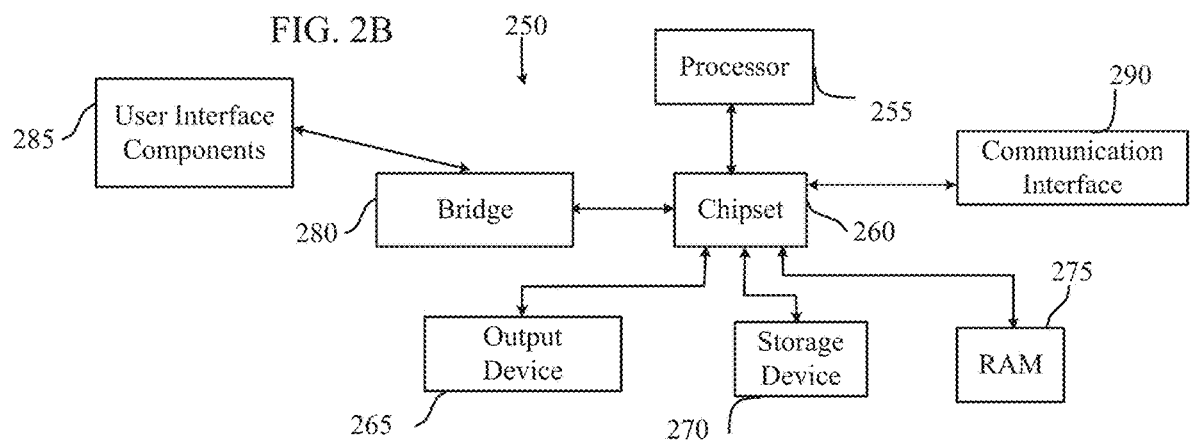
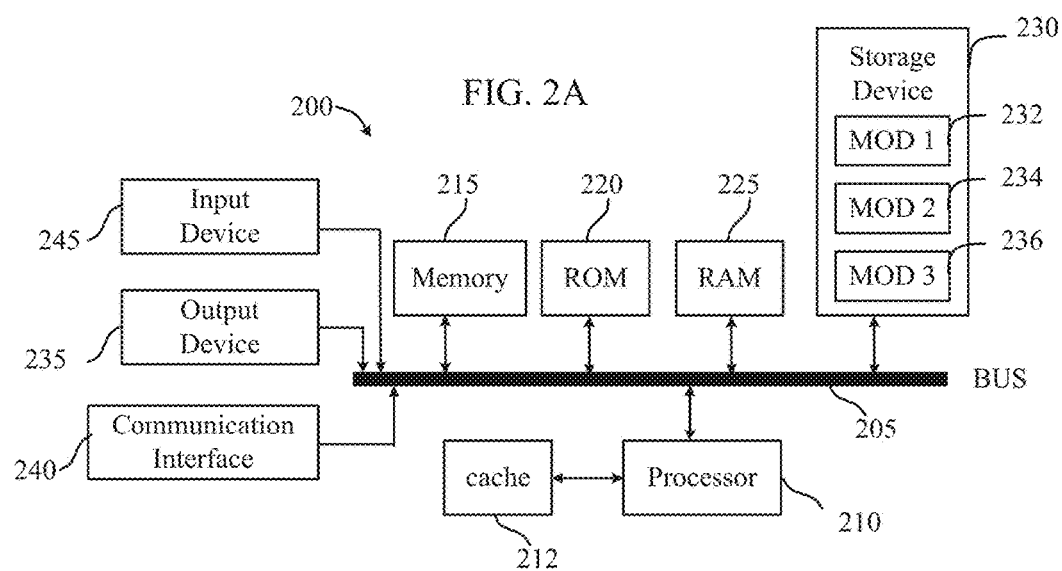

STAGE UPGRADE OF IMAGE VERSIONS ON DEVICES IN A CLUSTER

CROSS REFERENCE TO RELATED APPLICATIONS

This application is a continuation of U.S. patent application Ser. No. 14/477,812 filed on Sep. 4, 2014, which claims priority to U.S. Provisional Patent Application Ser. No. 61/900,359 filed Nov. 5, 2013, the contents of which are incorporated by reference in their entireties.

TECHNICAL FIELD

The present technology pertains to image upgrades, and more specifically pertains to upgrading image versions on devices in a cluster.

BACKGROUND

Multi-tenant datacenters typically have numerous network devices, such as routers and switches, which are interconnected to provide service and connectivity to the various tenants in the datacenter. In particular, many of these network devices provide network connectivity to tenant infrastructure, while others are connected to servers and other devices in the tenant space to provide application and network services. Some application and network services can include, for example, DHCP, NTP, firewall and security services, policy services (e.g., Policy Gateway servers), and so forth. As such, these network devices provide important services in the datacenter, and any interruption in service can be extremely disruptive and inconvenient.

However, many times, the various devices in a datacenter must undergo upgrades, which can result in downtime for the upgraded devices and thus the services they provision. Not surprisingly, image upgrades of network devices in the datacenter can be very difficult to implement, as each image upgrade often results in service disruptions. This challenge can become even more profound as the number of network devices in the datacenter—and consequently the potential service disruption—increases. Unfortunately, many network devices in a datacenter do not fully support ISSU (in-service software upgrade), which would reduce the service disruption period from upgrading images, and must therefore undergo some period of downtime.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 2A and 2B illustrate example system embodiments according to some aspects of the subject technology;

DESCRIPTION OF EXAMPLE EMBODIMENTS

Figure 1:
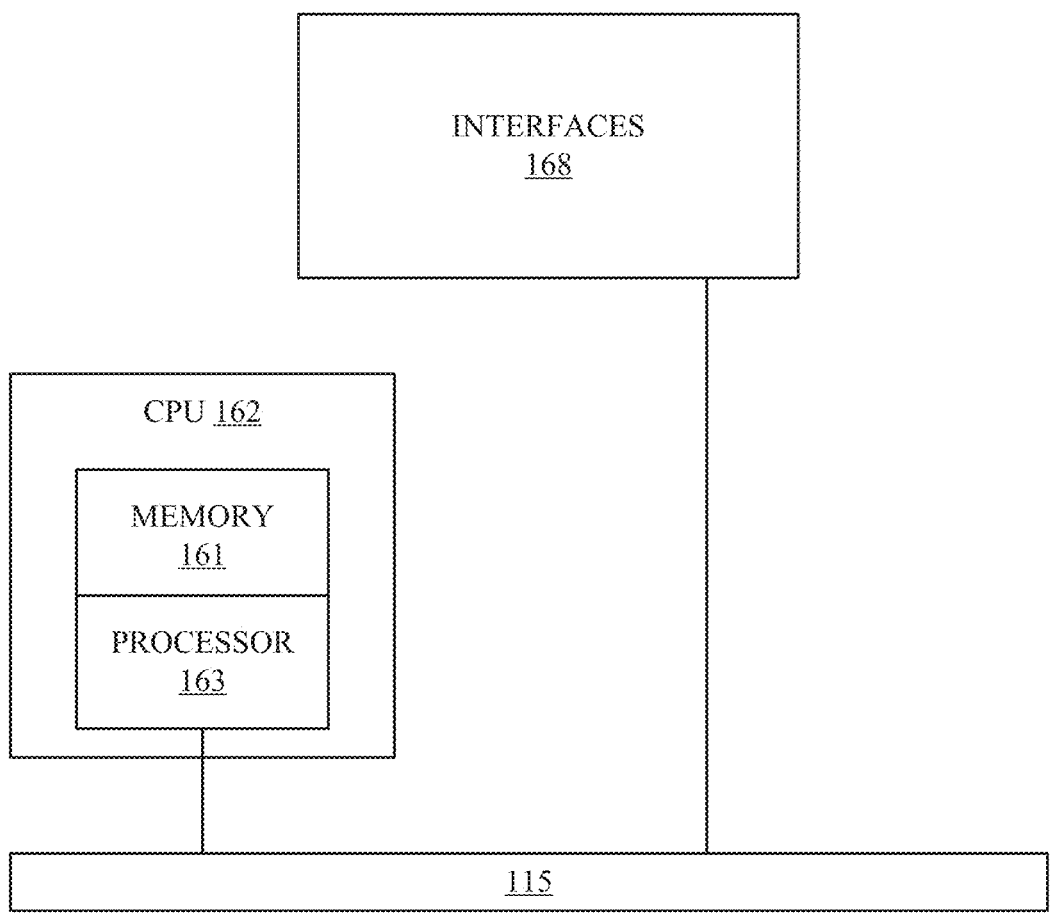
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

As previously mentioned, network devices in a datacenter can be very difficult to upgrade, as they typically result in service disruptions. Indeed, many network devices are low-end commodity switches which do not provide full-fledged ISSU (in-service software upgrade) and, as such, must undergo some period of downtime during an image upgrade. Moreover, various strategies for performing image upgrades may reduce the downtime, but nevertheless may result in long and unacceptable service disruptions.

For example, doing image upgrades in a random manner might render tenant services unavailable for unnecessary long periods of time. On the other hand, if each switch is upgraded sequentially, then the impact of such image upgrades to tenant service and traffic can be reduced. However, this can also result in a disruptive and prolonged process, as it requires a long window of time for upgrading.

On another extreme, shutting down all switches and upgrading them in one shot has the shortest upgrade time, but the maximal impact to all tenant traffic and service in that period, as it would result in all services and connectivity being completely down. This may not be acceptable in many cases.

The disclosed technology addresses the need in the art for minimizing downtime when performing image upgrades on network devices, such as switches. Disclosed are methods, systems and computer-readable media for stage upgrades of image versions on network devices in a cluster. First, the system can generate a graph including vertices interconnected in the graph, the vertices showing a distribution of associated switches in a network. The network can be a multi-tenant network, and the vertices can be interconnected to represent that the corresponding vertices provide service to the same tenant. The vertices can be graph-data structure based nodes in the graph.

However, note that while the graph is described here as having vertices, one of ordinary skill in the art will readily recognize that these concepts can be implemented using any type of representation or structure, including representations or data structures having one or more attributes or graphical formats. For example, in some cases, the graph can be generated with graph-data structure based representations. Here, the graph-data structure based representations can represent the switches in the network. Other types and structures for representations and graphs are contemplated herein, including any type of graphical representation instead of, or in addition to, vertices, or any type of view, display, or data structure instead of, or in addition to, a graph.

The system can then display the vertices and interconnections of the vertices in the graph according to a respective graphical attribute selected for the vertices and the interconnections, the respective graphical attribute selected to represent services provided by the associated switches to tenants in the network, wherein each of the vertices are displayed having a graphical attribute selected based on a type of service provided by each of the associated switches and/or an identity of a tenant serviced by each of the associated switches.

In some embodiments, the respective graphical attribute can be a color given to each of the vertices. Here, the vertices can be colored based on the services they provide in the network to a particular tenant. If two interconnected vertices provide service to a same tenant, those vertices can be given different colors to distinguish them in the graph. Since the attributes of the vertices (e.g., the colors) are used to determine what stage the devices represented by those vertices will be upgraded in, as will be explained further below, the different attributes provided to neighboring vertices can ensure that those vertices are assigned to different upgrade stages. As a result, if the two devices serve the same tenant, they will be upgraded in different stages to minimize the disruption to the tenant.

In some cases, the attributes can include a color, a line weight, a size, a shape, a symbol, a character, a label, and so forth. Moreover, the attributes can be selected based on services provided by the corresponding devices such that the upgrade of devices servicing specific tenants is distributed in order to minimize impact or disruption to those tenants. For example, devices that serve a same tenant can be given different attributes to place the devices in different upgrade categories or stages, and thus distribute the upgrades to a particular tenant.

Next, the system can schedule an upgrade of at least a portion of the associated switches, the upgrade being scheduled in stages, each of the stages including a portion of switches selected for upgrade in that stage based on respective graphical attributes associated with the vertices and interconnections, wherein switches associated with vertices and interconnections having a same graphical attribute are scheduled for a same stage to be upgraded in parallel during the same stage. Accordingly, the attributes of the vertices and interconnections in the graph can be assigned to specific stages in a multi-stage upgrade schedule, and the graph can thus quickly indicate the corresponding stage for each of the vertices based on the attributes given to the vertices. As previously mentioned, the attributes can be implemented to distribute the impact to every tenant in the network by partitioning the upgrades to devices that are pertinent to each tenant into multiple upgrade stages.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for minimizing disruptions of network device upgrades in networks. Disclosed are systems, methods, and computer-readable storage media for stage upgrades of image versions on network devices in a cluster. A brief introductory description of exemplary systems and networks, as illustrated in FIGS. 1 through 5, is disclosed herein. A detailed description of generating graphs for upgrading devices in a network, implementing the graphs to upgrade devices in the network, related concepts, and exemplary variations, will then follow. These variations shall be described herein as the various embodiments are set forth. The disclosure now turns to FIG. 1.

FIG. 1 illustrates an example network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
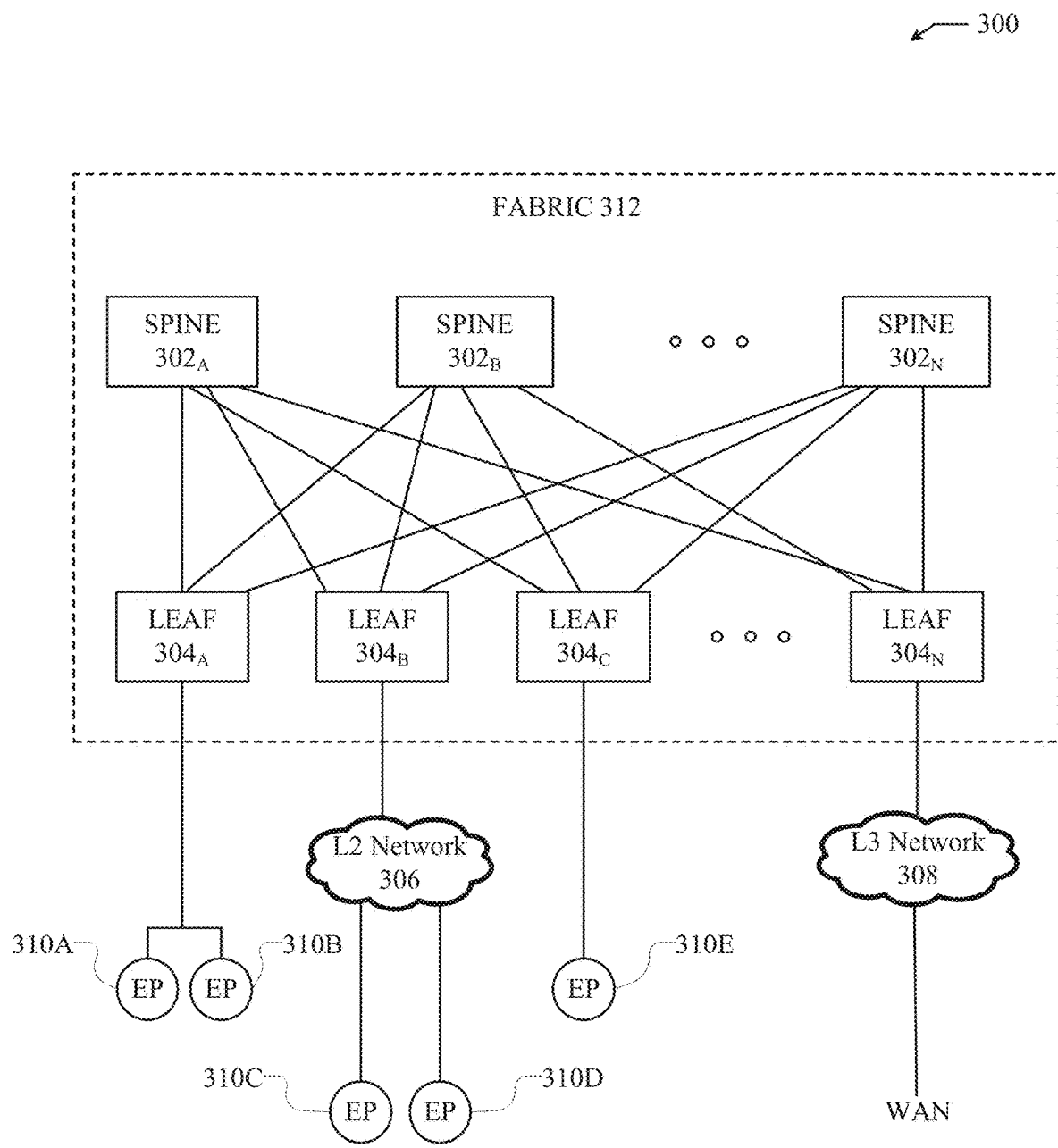
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$, ..., $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
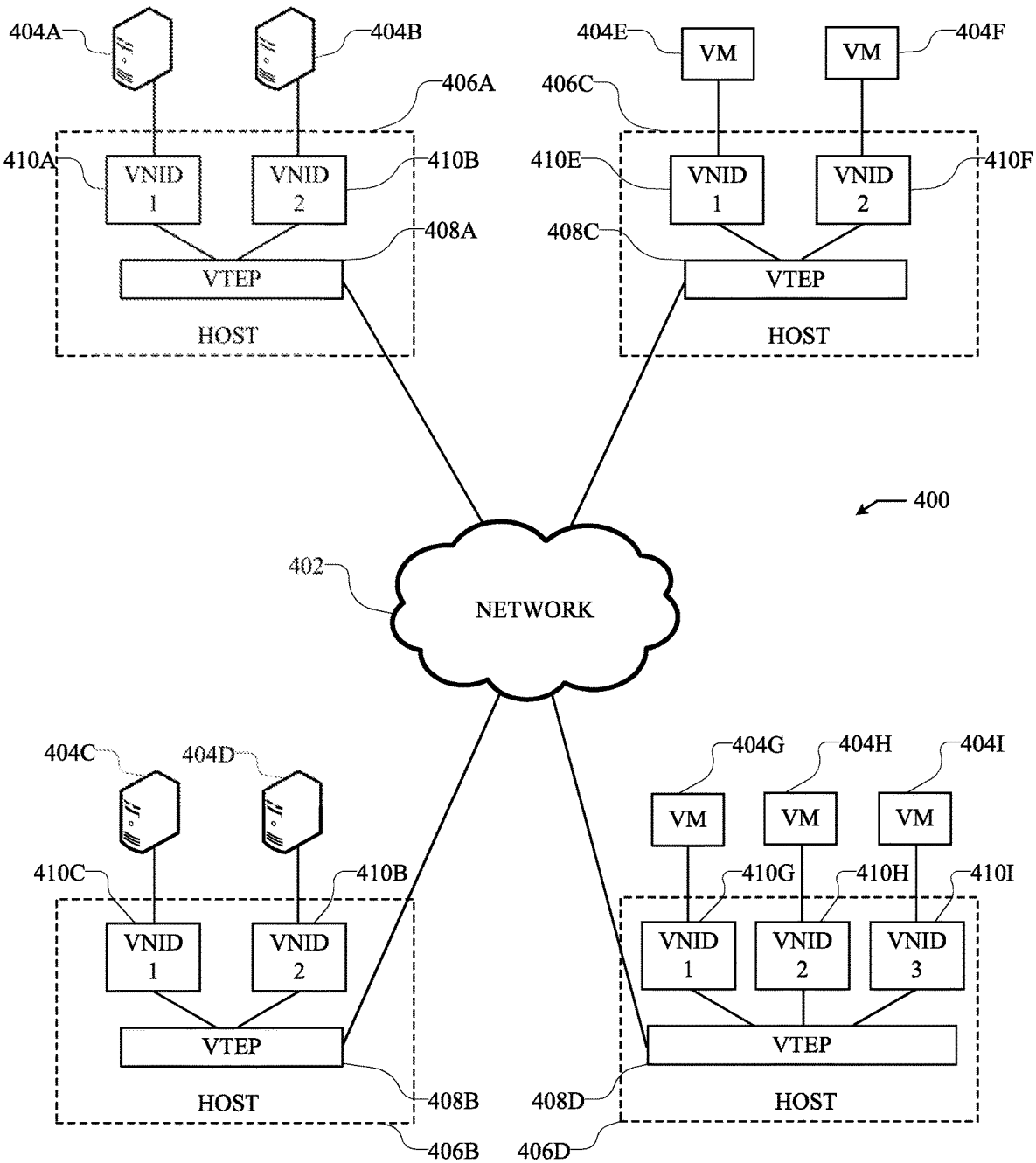
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing or lookup table to determine where the packet needs to be transmitted, to ensure the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

In some cases, the routing table may not yet include any mappings or bindings for the destination address in the packet. In such cases, the switch can broadcast or multicast the packet to multiple addresses, which are typically associated with multiple switches or routers, to ensure the packet reaches a device that is either connected to the destination device and thus can directly forward the packet to the destination, or otherwise knows where the packet needs to be forwarded (i.e., next hop) so it reaches its destination.

As one of ordinary skill in the art will readily recognize, the examples and technologies provided above are simply for clarity and explanation purposes, and can include many additional concepts and variations.

Figure 5:
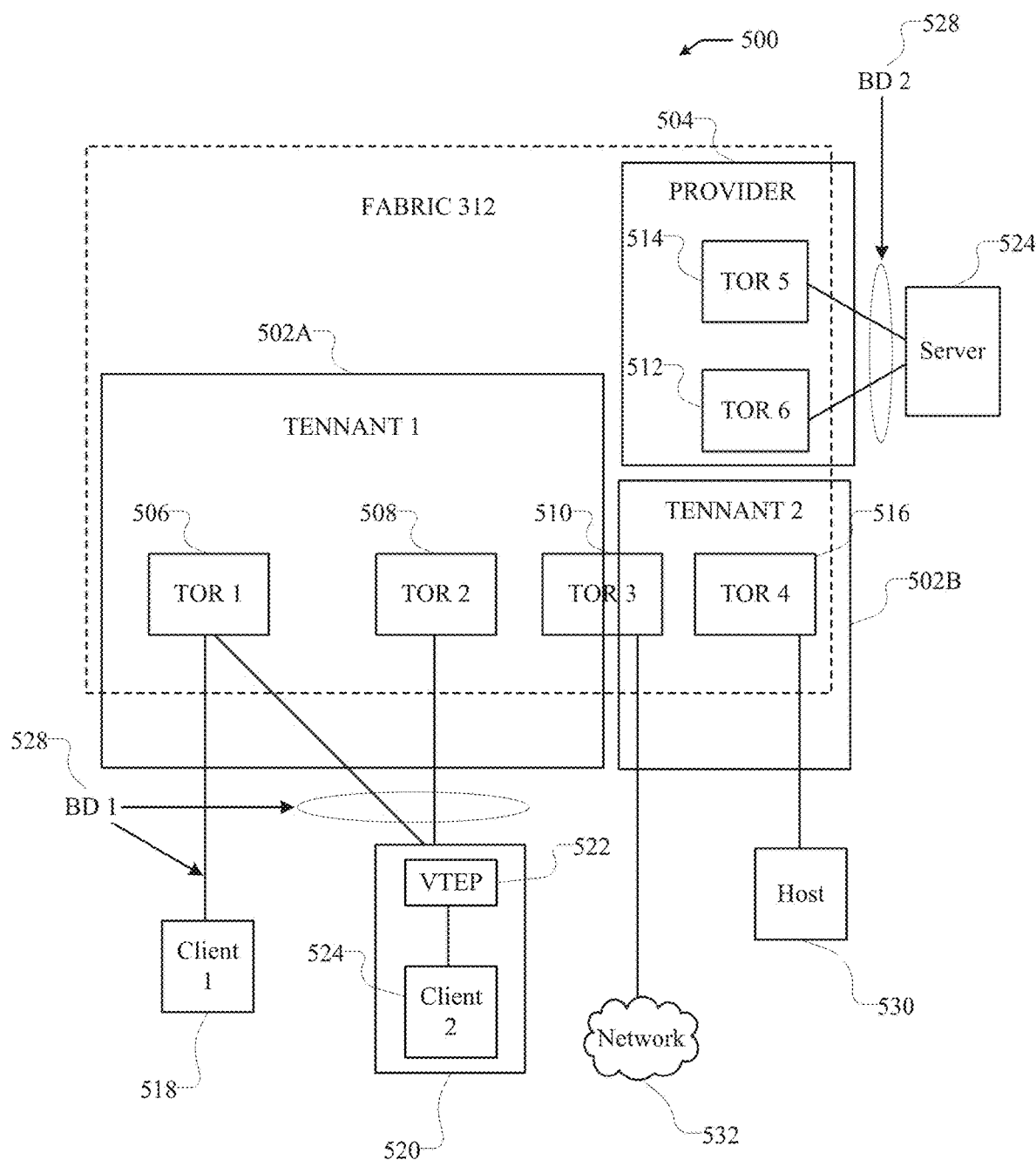
FIG. 5 illustrates an example multi-tenant network.

FIG. 5 illustrates an example multi-tenant fabric 500. The multi-tenant fabric 500 can be based on a network fabric, such as fabric 312 illustrated in FIG. 3. Accordingly, the multi-tenant fabric 500 can include spine and leaf switches, such as spine switches 302 and leaf switches 304. Moreover, in some cases, the ToR switches 506-516 can be leaf switches in the fabric 312, such as leaf switches 304.

The multi-tenant fabric 500 can include multiple tenants 502A-B and one or more providers, such as provider 504. For example, the multi-tenant fabric 500 can include tenants 502A-B and provider 504. Moreover, while the multi-tenant fabric 500 is illustrated in FIG. 5 as having two tenants (502A-B) and one provider (504), one of ordinary skill in the art will readily recognize that the number of tenants and providers in a multi-tenant fabric 500 can differ in other embodiments based on the specific environment and circumstances. Indeed, other embodiments with more or less tenants and/or providers are contemplated herein. However, the multi-tenant fabric 500 is illustrated as having two tenants and one provider as a non-limiting example for the sake of clarity.

The tenants 502A-B can refer to client or tenant space in the network which is assigned or allocated for the particular client or tenant. For example, the tenants 502A-B can be logical divisions or segments in the network which can be segregated from each other, such as virtual routing and forwarding (VRF) spaces. The tenants 502A-B can contain the tenant infrastructure for the associated tenants, to service those tenants accordingly. For example, the tenants 502A-B can include the infrastructure used for application and network services provided to those tenants.

Similarly, the provider 504 can refer to provider space in the network assigned or allocated for the particular provider. For example, the provider 504 can be a logical division or segment in the network which segregates the provider's infrastructure from other infrastructure. In some cases, the logical division for the provider 504 can be a VRF configured on the network. The provider 504 can contain provider infrastructure for a provider, such as a service or network provider. Thus, the provider 504 can include the necessary infrastructure and configuration to support the services provided and received by the provider associated with the provider space 504.

Each of the tenants 502A-B and provider 504 can include switches, such as ToRs 506-516, configured to connect the tenants 502A-B and provider 504 to other devices, clients, servers, and/or networks. For example, tenant 502A can include ToRs 506-510, which can reside in the space allocated for tenant 502A. Here, ToR 506 can connect tenant 502A to client 518, which can be a terminal, virtual machine, host, server, etc. ToR 506 can also connect to host 520 via VTEP 522. For example, ToR 506 can establish a tunnel with VTEP 522 to connect host 520 to tenant 502A. The host 520 here can include client 524, for example, which can be a terminal, virtual machine, server, service appliance, etc. For example, client 524 can be a virtual machine running a DHCP server that connects to ToR 506 through VTEP 522.

ToR 508 can similarly connect to host 520 through VTEP 522, and ultimately to client 524. In some cases, one or more connections can be configured to be part of a bridge domain (BD) to allow packets to be broadcast to the various devices associated with those connections. For example, the connections between ToRs 506 and 508 and client 518 and host 520 can be configured to be part of the same BD 528. Accordingly, ToR 506 and 508 can flood packets, such as control or data packets, to both client 518 and host 520 even when client 518 and host 520 are part of separate logical segments.

ToR 510 can reside on tenants 502A and 502B. Moreover, ToR 510 can connect to network 532, which can be a layer 2 (L2) or layer 3 (L3) network, for example. ToR 516 can reside on tenant 502B, and can connect host 530 to tenant 502B on the fabric 312. Host 530 can be a physical server or device, but can also include a virtual workload, such as a virtual server, a virtual appliance, or any virtual machine.

ToRs 512 and 514 can reside on provider 504, and can connect server 524 to the provider 504. The server 524 can be any type of server, including one or more physical and virtual servers, such as a DHCP server, a DNS server, a gateway policy server, a storage server, and so forth. However, in other cases, the server 524 can refer to any type of device or appliance, such as a terminal, a firewall, an intrusion detection system, a domain controller, etc. In some cases, the server 524 can have separate connections to the ToRs 512 and 514 configured to reside on the same BD 528. In other words, the connection from server 524 to ToR 512 and the connection from server 524 to ToR 514 can be part of the same BD. Thus, if ToR 512 or ToR 514 floods a packet over BD 528, the server 524 will receive the traffic irrespective of which ToR 512 or 514 flooded the packet.

As illustrated in the multi-tenant fabric 500, multiple ToRs 506-516 or devices serve the multiple tenants 502A-B, as well as provider 504 and the different devices and networks connected to the ToRs 506-516. Thus, when upgrading the ToRs 506-516, the different tenants, provider (s), devices, and networks can be affected by any downtime of the ToRs 506-516 which serve them. For example, upgrading all of the ToRs 506-516 at the same time would cause any tenant, provider, device, or network to experience a disruption of all services provided by the ToRs 506-516. On the other hand, upgrading all of the ToRs 506-516 sequentially may result in smaller disruptions to each affected entity, but it prolongs the upgrade window which, in larger networks, may extend to unreasonable or unfeasible levels. Accordingly, a graph as illustrated below can be generated to define an upgrade plan that minimizes the disruptions to each entity as well as the overall upgrade window.

The graph can be generated taking into account what services are provided by each of the ToRs 506-516, what entities (e.g., tenants, providers, devices, networks, etc.) are served by the ToRs 506-516 and thus are affected by disruptions to the ToRs 506-516, how many ToRs provide a specific service to any one entity (e.g., whether an entity is serviced by one ToR, two ToRs, three ToRs, etc., which would help determine a sequence for upgrading the ToRs servicing an entity with minimal disruption to that particular entity), how many and what type of services are provided by each ToR to each entity, and any other factor that may affect the level of disruption to one or more entities and the length of the upgrade window. As such, the graph can account for the relationship of each ToR to each entity, and the degree of disruption that would be experienced by any particular entity from an upgrade of one or more of the ToRs.

This way, the graph can be used to generate a multi-staged upgrade schedule that provides a sequence of upgrades and assigns ToRs to upgrade stages to yield minimal disruptions or downtime experienced by each entity and smaller upgrade windows. The graph can show a distribution of ToRs with connections representing services provided to entities, such as tenants, where a connection between two or more ToRs can indicate a service provided by the connected ToRs to an entity, and the connection can be depicted to represent the type and/or number of services provided by each ToR or connection of ToRs.

The ToRs in the graph can be illustrated based on specific graphical characteristics associated with their respectively assigned upgrade stage. For example, the ToRs can be colored in the graph where the specific color of the ToR in the graph can indicate which stage it should be upgraded in. Here, the upgrade schedule can define several upgrade stages where each stage is represented by a color. While color is used herein to describe the graphical characteristics used to depict the ToRs assigned to different stages, one of ordinary skill in the art will readily recognize that other characteristics, such as lines, patterns, symbols, size, shape, shades, numberings, etc., can be used in other embodiments to represent what upgrade stage a ToR is assigned to. However, color is used herein as a non-limiting example for the sake of clarity.

The disclosure now turns to a discussion of graphs for upgrading network devices in a network. A graph can be generated for implementing an upgrade schedule resulting in an upgrade window where tenant traffic and service impact is limited and the total upgrade window time is reduced. The image upgrades be based on a scheme, as described below, which can limit downtime and reduce the total upgrade time window. The upgrades can be performed from one or more centralized devices configured to manage images, such as one or more fabric controllers, to help manage the upgrade process. However, in some embodiments, the upgrades can be performed per device. Moreover, in some cases, the actual image download and upgrade can be delegated to an agent running on the switch, such as policy engine or a software upgrade engine.

As mentioned before, some switches, including spines such as spines 302 in FIG. 3, can have dual supervisor engines or dual-SUPed, (dual-supervised). Such switches can support ISSU, and hence image upgrades for those switches can be done with less disruption. On the other hand, many switches do not support ISSU. For example, many ToRs (e.g., ToRs 506-516) or leaf switches (e.g., leaf switches 304) typically do not support ISSU. Moreover, these switches are generally too numerous in datacenter networks to be upgraded sequentially without unnecessarily burdensome disruptions of services to tenants and clients. Precisely, many of these switches reside in large clusters which can extremely prolong the upgrade time window. To this end, the graphs and upgrade schedules described herein can be implemented to upgrade switches with minimal or limited service disruptions and smaller time windows.

Figure 6:
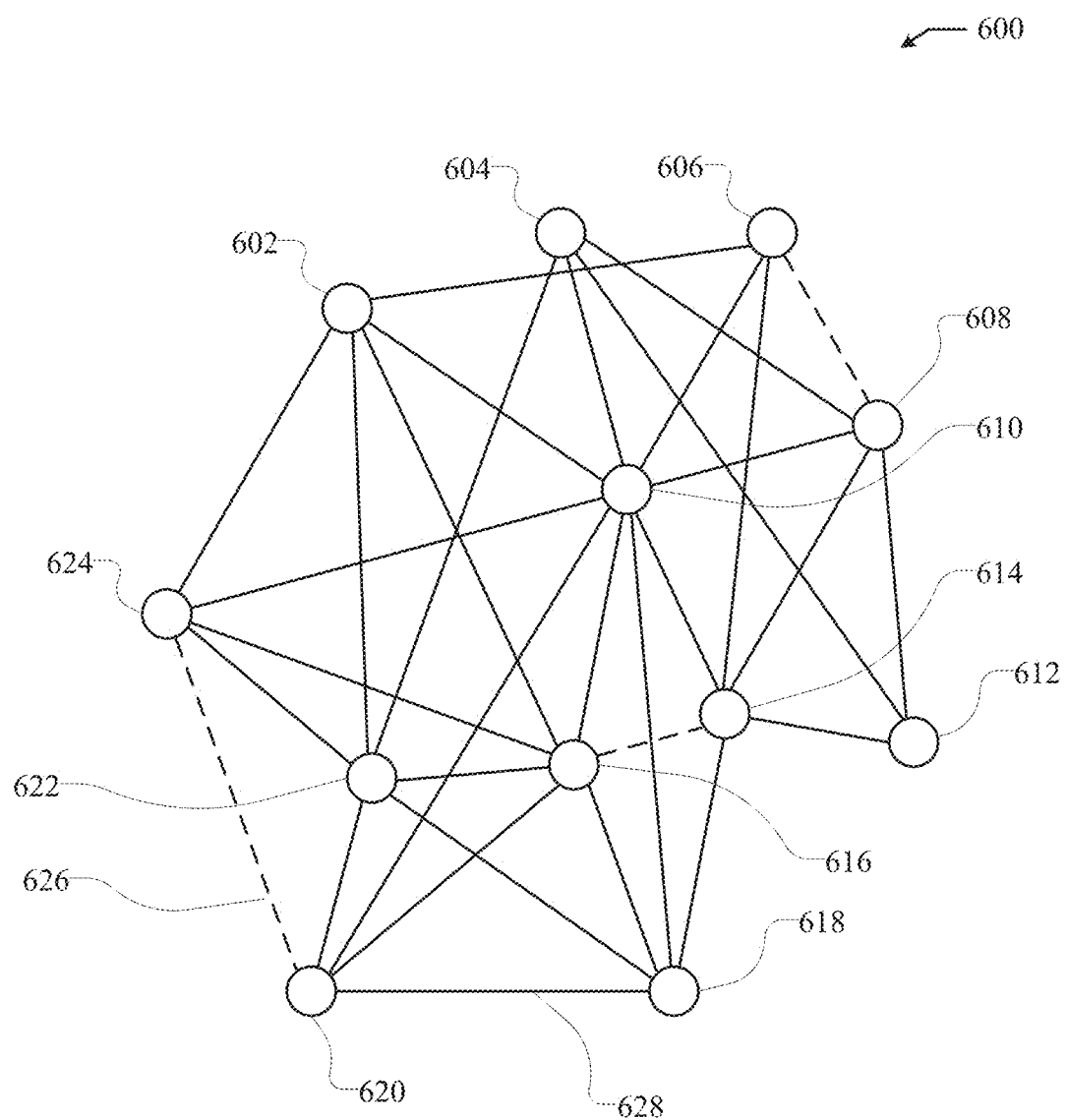
FIG. 6 illustrates an example graph showing vertices representing switches in a network.

Reference is now made to FIG. 6, which illustrates an example graph 600 showing a distribution of switches 602-624 for at least a portion of a multi-tenant network, such as multi-tenant network 500. The switches are represented as vertices on the graph 600 which can include, for example, the leaf switches 304 in FIG. 3 or the ToR switches 506-516 in FIG. 5. The multi-tenant network can include a fabric, such as fabric 312 with spine switches 302, and leaf switches 304 or ToR switches 506-516 which can be configured to provide services, such as network connectivity service or application service, to multiple tenants in the multi-tenant network. As previously mentioned, a tenant can be a customer, client, provider, or other users assigned to a physical and/or logical space in the network having infrastructure setup to provide one or more services to the tenant and associated devices.

The graph 600 can be generated to schedule upgrades to minimize upgrade time and limit service disruptions to tenants in the network. The upgrades can be scheduled in a multi-stage schedule, which can include multiple stages or time windows for upgrades. In some cases, the graph 600 can maximize the number of switches that can be upgraded in parallel in each upgrade stage. The graph 600 can also minimize impact to tenant traffic and service while reducing the overall upgrade time window.

The graph 600 can be generated by identifying vertices 602-624, which represent switches that serve the tenants in the multi-tenant network. The graph 600 can illustrate the distribution of vertices 602-624, and can include connections between the vertices 602-624. A connection between two vertices can represent a service being provided by the vertices to a same tenant. Each of the connections can be illustrated as a weak connection 626 or a strong connection 628. In some cases, a strong connection can represent an important service being provided by the connected vertices to the same tenant, whereas a weak connection, on the other hand, can represent a less important service being provided by the connected vertices to the same tenant. For example, an important service, such as DHCP or firewall service, can be used to form a strong connection between vertices that provide that same service to a same tenant. A less important service, such as network bandwidth or storage service, can be used to form a weak connection between vertices that provide that same service to the same tenant.

In other embodiments, a strong connection can be used to depict that the connected vertices provide the same service to the same tenant, such that bringing both vertices down would interrupt that service to that tenant, while a weak connection can be used to depict that the connected vertices provide different services to the same tenant.

The graph 600 can also include scoring of the vertices 602-624 to help determine the scheduling of upgrades. Here, the vertices can be graphically illustrated based on particular characteristics, as will be further described below, based on their associated score. The scores can then be used to assign vertices to upgrade stages in a multi-staged upgrade plan for the network.

In generating the graph 600, the connections between the vertices 602-624 can be shown as lines, as illustrated in FIG. 6. As previously mentioned, these connections can indicate that the interconnected vertices provide a service to the same tenant. The connections can be graphically depicted with specific characteristics to identify differences in the connections. For example, a dashed line can be used to depict a weak connection and a straight line can be used to illustrate a strong connection. Similarly, a straight line can be used to represent a weak connection when a bolded or emphasized line is used to represent a strong connection. In other cases, any other characteristic, such as color, pattern, line weight, numbering, dash type, etc., can be used to illustrate the connection as being a weak connection or a strong connection.

Indeed, in some cases, the connection strength can be depicted with greater granularity where additional levels of strength of connection are illustrated using various characteristics. For example, different characteristics or graphical connections can be used to depict connections having a strength level of level 1, level 2, level 3, level 4, and so forth. Moreover, the various strength levels can depend based on one or more factors, such as type of service provided, degree of redundancy or failover available to that tenant, etc. In some cases, the scores calculated for the vertices can also be used to determine the strength level of a connection.

For example, for a given pair of switches, represented by vertices 602-624, a weight of each edge can be calculated. In some embodiments, the weight can be the sum total of various tenants to whom the switches provide service (with some factor) and/or network connectivity to. For each vertex, the weight can be calculated as a sum of the edge of all edges which has this vertex as an endpoint. The weights can then be used to determine how to represent the vertex in the graph 600 and ultimately determine what stage from the multi-staged schedule to assign to that vertex for upgrading.

Each vertex can be illustrated based on a particular characteristic, such as a specific color, pattern, symbol, shape, size, etc. The particular characteristic can be selected based on the score of the vertex, the relationship of the vertex to other vertices, the service provided by that vertex, the tenant serviced by that vertex, the number of other vertices servicing the tenant serviced by that vertex, etc. In some embodiments, each vertex is colored based on the tenants they service with respect to other vertices or edges. For example, each vertex can be colored based on a color pattern.

Moreover, vertices which are interconnected by an edge are colored differently. Vertices interconnected by an edge represent switches servicing the same set of tenants. Accordingly, since vertices servicing a same tenant share an edge, those vertices are colored different so as to avoid upgrading all vertices to a tenant at the same time, which can lead to greater service disruption to that tenant. Instead, given that vertices with the same color are upgraded in parallel, the graph 600 can ensure that vertices that service the same tenant are upgraded in different stages by coloring those vertices with different colors. This can minimize service disruptions to that tenant.

In some embodiments, as seen in graph 600, any two vertices that share an edge (either a weak edge or a strong edge) represent switches that provide service to the same tenant. Thus, two vertices colored the same would not have any edge between them; meaning, the two vertices do not provide service to the same tenant (or the same set of tenants). The impact to each tenant is thereby minimized. This may be particularly the case if the upgrade schedule has enough distinct upgrade windows. Otherwise, in some embodiments, the upgrade schedule may be balanced to include less upgrade windows (e.g., to reduce the total upgrade window). In such cases, there may be some vertices which share a tenant service but are scheduled at the same upgrade window or stage. Here, the sharing of a stage or upgrade window between vertices that share a tenant may be identified based on one or more factors, including, but not limiting, the desired size of the total window, the type of service to that tenant, the estimated disruption to that tenant, the size of the upgrade window, prior history or agreements with that tenant, etc.

Furthermore, the graph 600 can be generated by one or more devices configured to generate the graph based on data about the multi-tenant network, including switches in the network, tenants in the network, services provided to each tenant, switches providing each service to each tenant, etc. The data can be collected by the one or more devices through user inputs, collected statistics, network monitoring, network analysis, configuration files, scripts, packets, probing, etc. In some embodiments, the graph 600 can be generated by a centralized device, such as a network controller. For example, the various switches in the network can be configured to report data to the centralized device, which can use the data to generate the graph 600 using a script or a program.

Figure 7:
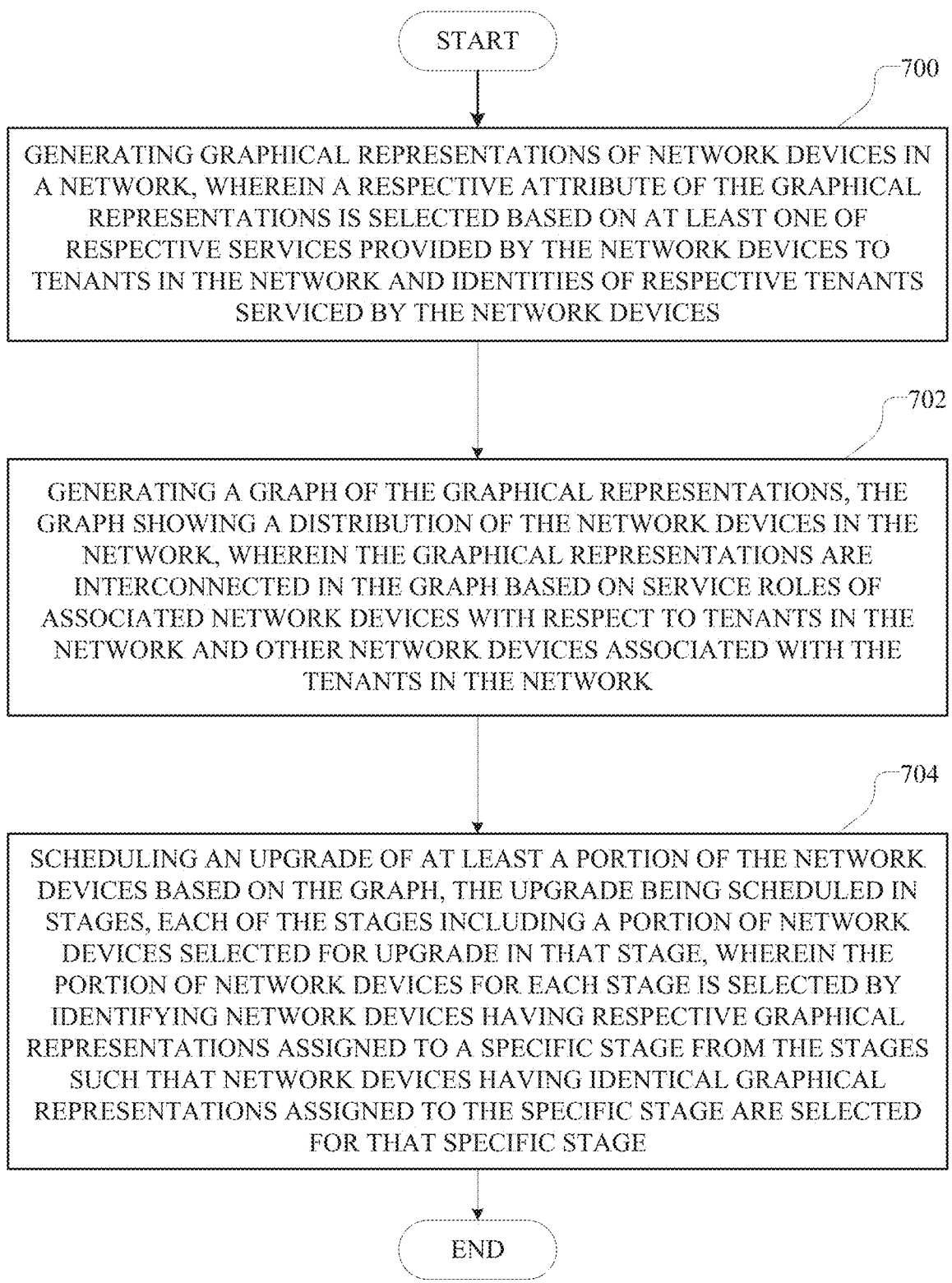
FIG. 7 illustrates an example method embodiment for scheduling upgrades in a network.

Reference is now made to FIG. 7, illustrating an example method 700 for generating a graph for creating an upgrade schedule. For the sake of clarity, the method is described in terms of a system, such as system 110 shown in FIG. 1, configured to practice the method. The steps outlined herein are exemplary and can be implemented in any combination thereof, including combinations that exclude, add or modify certain steps.

At step 702, the system 110 first generates graphical representations of network devices in a network, wherein a respective attribute of the graphical representations is selected based on at least one of respective services provided by the network devices to tenants in the network and identities of respective tenants serviced by the network devices. Here, the network can be a network fabric, such as fabric 312 illustrated in FIG. 3. Moreover, the fabric can include multiple tenants, such as the multi-tenant network 500 illustrated in FIG. 5. Further, the graphical representations can be images, objects, vertices, figures, lines, symbols, words, etc. For example, in some embodiments, the graphical representations are vertices or nodes representing switches in the network. In some embodiments, the graphical representations are graph-data structure based representations. Also, the network devices can be switches, routers, or any other network device. For example, the network devices can be switches, such as leaf switches 304 or ToR switches 506-516.

Furthermore, the respective attribute can include a color, a line weight, a pattern, a symbol, a texture, a shape, a size, a symbol, a number, or any other attribute. For example, in some embodiments, the respective attribute can be a color such that the graphical representations are colored based on a color selected for each graphical representation. Moreover, as previously mentioned, the respective attribute of a graphical representation of a switch can be selected based on what, if any, services the switch provides to a specific tenant, as well as what and how many other switches in the network provide that specific service, or any other service, to the tenant serviced by the switch. In other words, the respective attribute of a graphical representation of a switch can be selected based on a determination of what tenants are serviced by the switch, how many tenants are service by the switch, what type of service is provided by the switch to a specific client, what or how many other switches provide the same or other service to each tenant serviced by that switch, etc.

For example, assume the respective attribute in this example is color and the graphical representations are vertices for a graph. Here, the color of the vertices for each switch can be selected based on what tenant(s) that switch serves, what type of service it provides to that tenant(s), what other switches service that tenant(s), etc. Thus, for example, the system 110 (also called the network device, switch, or router) can determine that ToR 506 represented by vertex 1 provides DHCP service to tenant 502A, but tenant 502A also receives DHCP service from ToR 508 represented by vertex 2. Accordingly, the system 110 can pick a color for vertex 1 and vertex 2 knowing that both ToRs 506 and 508 provide DHCP service to the same tenant; namely, tenant 502A. In some embodiments, the system 110 will pick different colors for vertices that provide the same service to the same tenant. Thus, in this example, the system 110 can color vertex 1 with one color, such as blue, and color vertex 2 with a different color, such as red.

The colors can then be used, as will be described in steps 704-706 below, to generate a graph with colored vertices that represent switches in the network, and the colors can be used to assign upgrade stages to the vertices when performing a multi-stage upgrade. For example, all vertices colored blue can be upgraded in the same upgrade stage or window, and all vertices colored red can be upgraded in the same upgrade stage or window which is different than the upgrade stage or window used for the blue colored vertices.

Accordingly, in the previous example, ToR 506 represented by vertex 1 which is colored blue, can be upgraded in a stage that is different than the upgrade stage of ToR 508 represented by vertex 2 which is colored red. In this way, ToR 506 can be upgraded at the same stage as all other blue-colored vertices and ToR 508 can be upgraded at the same stage as all other red-colored vertices. Moreover, since ToR 506 and ToR 508 are represented by vertices with different colors, this can ensure that these two switches are upgraded in different stages. And given that these two switches both provide the same service to the same tenant, tenant 502A, this can stagger the upgrade of these switches so that tenant 502A experiences minimal disruption of services, as ToR 506 can remain up and running DHCP service while ToR 508 is upgraded and vice versa.

At step 704, the system 110 then generates a graph of the graphical representations, the graph showing a distribution of the network devices in the network, wherein the graphical representations are interconnected in the graph based on service roles of associated network devices with respect to tenants in the network and other network devices associated with the tenants in the network. The service roles can refer to what services are provided by the network devices and to what tenants. For example, the service roles can define what service, such as DHCP or firewall service, a switch provides to a specific tenant. The service roles can be considered relative to other network devices in the network and the tenants they service. In other words, the service role of a switch (e.g., what service it provides, how many services it provides, and what tenants it serves) can be identified by determining what services the switch provides to what tenants and what other switches serve the same tenant(s)— including the same service and/or other services. The information about the service roles of the network devices can then be used to generate the interconnections of the vertices in the graph.

For example, the system 110 can determine the service role of a switch by identifying what service it provides to what tenant(s). Thus, if ToR 506 provides DHCP service to tenant 502A, the system 110 can determine that the service role of ToR 506 is to provide DHCP service to tenant 502A. The system 110 can then determine what other switches serve that same tenant, tenant 502A. From our previous example, the system 110 can determine that ToR 508 also serves tenant 502A. Thus, the system 110 can determine that both ToRs 506 and 508 serve the same tenant (tenant 502A). In some cases, the system 110 can then determine if the service provided by both ToRs 506 and 508 to the same tenant (tenant 502A) are the same service (e.g., DHCP service) or if they provide different services to the same tenant. Based on this information, the system 110 can generate the interconnections. Here, the interconnections can be generated between switches that serve the same tenant. Accordingly, since both ToRs 506 and 508 serve tenant 502A, the system 110 can create an interconnection in the graph between ToRs 506 and 508.

The interconnections can also be illustrated having specific attributes based on the service roles. For example, the interconnections can be bolded, dashed, straight lines, heavier, lighter, colored, etc., to show specific attributes or details about the interconnections. The specific attributes or details can show whether an interconnection is a strong connection or a weak connection. A strong connection can be determined based on the type of service provided by the network device to a tenant. For example, if the service is an important service or the tenant does not have any redundancy or failover setup for that service, then the connection can be classified or identified as strong. On the other hand, if the service is of lesser importance or the tenant has redundancy setup for that service, then the service can be classified or identified as weak. In some cases, an important service can be an application service or a network service with high value to the customer or tenant, or otherwise which may result in high disruptions of stopped or interrupted.

For example, an important service can be DHCP service, firewall service, gateway policy server service, IDS, etc. On the other hand, a service of lesser importance can be a network connectivity service of lesser value to the customer or tenant, or otherwise a service which, if stopped, would result in less disruptions to the customer or tenant. For example, network bandwidth can be a service of less importance. Here, if the switch providing additional bandwidth is stopped, the tenant can continue to receive service, albeit at a lower bandwidth, and thus the tenant is minimally disrupted or inconvenienced.

In some embodiments, the interconnections between the vertices can be scored based on the service type (e.g., application service versus network connectivity service, value of service, etc.), quality of service (QoS) requirements, the number of devices servicing a corresponding tenant, the estimated disruption levels to the tenant resulting from a loss of service or downtime of the interconnected vertices, etc. The scores can then be used to select the respective attribute of the interconnections to illustrate the interconnections in the graph in a way that demonstrates their scores or values.

At step 706, the system 110 can schedule an upgrade of at least a portion of the network devices based on the graph, the upgrade being scheduled in stages, each of the stages including a portion of network devices selected for upgrade in that stage, wherein the portion of network devices for each stage is selected by identifying network devices having respective graphical representations assigned to a specific stage from the stages such that network devices having identical graphical representations assigned to the specific stage are selected for that specific stage. By scheduling the upgrade in stages, the system 110 can create a multi-stage upgrade schedule which it can use to upgrade devices in the multi-tenant network with minimal disruption and upgrade time window.

The number of stages in the schedule can depend on the size of the network, the number of tenants, the number of services provided, the number of switches in the network, the size and time of the upgrade, the upgrade requirements of the network, the average amount of service redundancy in the network, etc. As a non-limiting example, if the network only has 2-3 tenants, the number of stages can be reduced to under 5 stages. On the other hand, if the network has 100s or 1000s of tenants, the number of stages can be in the 100s or 1000s, for example.

Moreover, each of the network devices to be upgraded can be assigned to a specific stage for upgrade during that stage. For example, in a multi-stage upgrade schedule with 20 stages, ToR 506 can be assigned stage 2 and ToR 508 can be assigned stage 5, where each ToR is assigned a designated stage. All devices assigned to a particular stage can be upgraded during that stage. The upgrades during a particular stage can be performed in parallel or sequentially throughout the timespan or time window of the stage. Also, the various network devices can be upgraded in different stages in order to stagger or spread the upgrades and minimize impact. As previously mentioned, the network devices can be staggered in their upgrade based on the graph. For example, if vertices that are interconnected indicate that they serve the same tenant and thus would have different respective attributes, which would consequently mean that those vertices would be assigned to different stages in order to stagger the upgrades of devices that serve the same client.

Moreover, since the graph can illustrate estimated disruption levels through respective attributes of vertices and interconnections (e.g., strong versus weak, connections with varying scores, etc.), the estimated disruption levels can be taken into account when scheduling the upgrades over multiple stages. For example, strong interconnections that pertain to a specific tenant can be distributed to different stages so that strong interconnections are not upgraded in the same stage but instead are distributed over multiple stages. This can help minimize the disruption to the tenant and lower the window of time for the upgrade.

The upgrades can then be performed based on the scheduling generated. In some embodiments, the upgrades can be performed from a centralized location, such as a centralized network controller. Here, the network controller can download the images to the network devices for upgrade, or otherwise download a script to initialize a download of the images from the network controller or another location, such as a remote network location. In other embodiments, each of the devices to be upgraded can perform their own upgrade during their assigned stage based on the scheduling.

Figure 8:
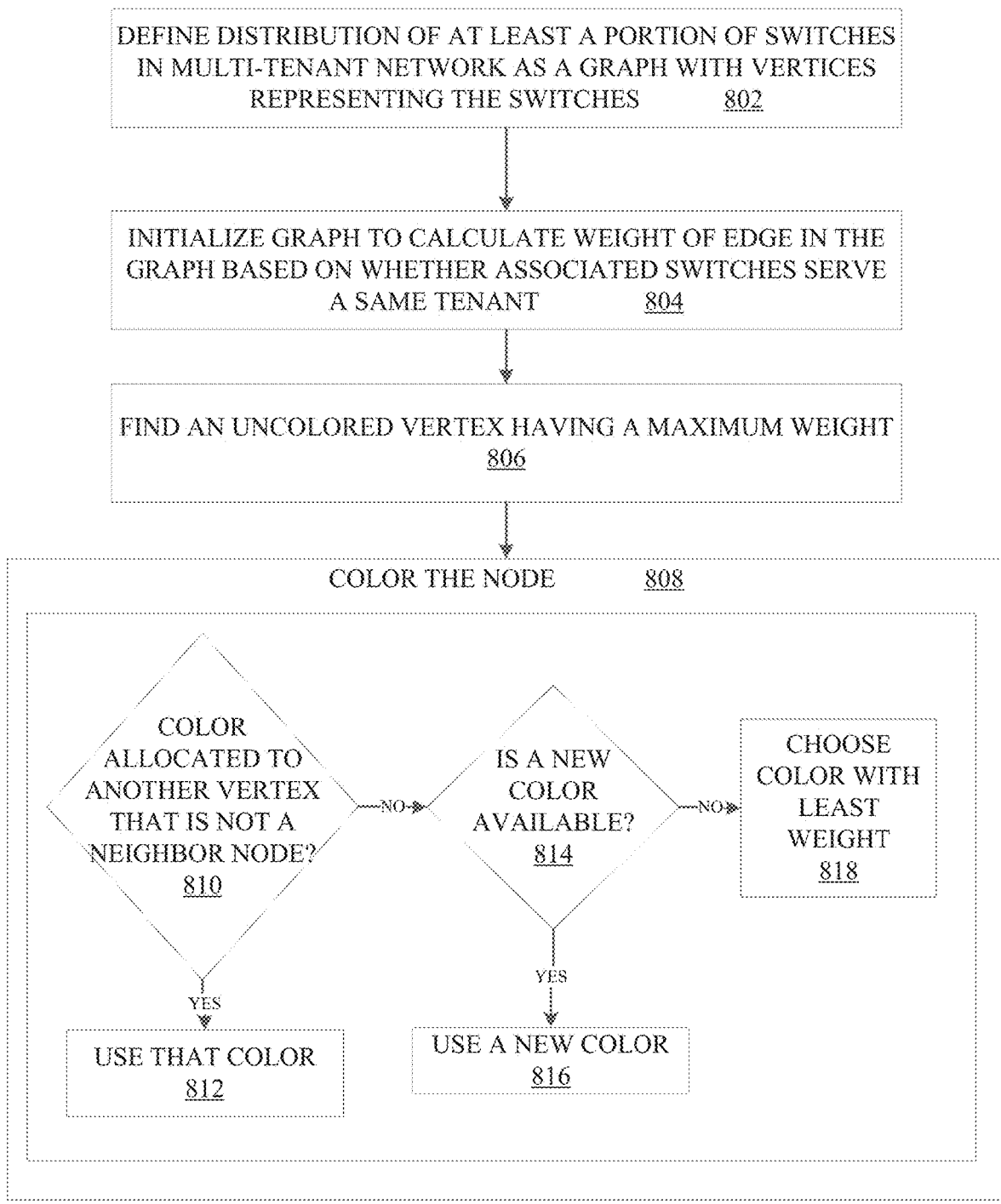
FIG. 8 illustrates an example method for generating a graph for scheduling upgrades.

FIG. 8 illustrates an example method of generating a graph for upgrading devices in a network. At 802, a system defines the distribution of at least a portion of switches in a multi-tenant network as a graph with vertices representing the switches, such as graph 500 shown in FIG. 5. At step 804, the graph is initialized so that edges are provided between vertices and the weight of edges is determined based on a service provided to a same tenant.

At step 806, an uncolored vertex is located having a maximum weight. After the graph has been constructed, the maximal degree of each vertex can be found. In some instances, a graph with maximum degree can be colored using at the maximum degree+1 colors. The vertex visit order of the scheme can be determined based on the heuristic given below. If an upgrade window of the maximum degree+1*(Time to upgrade one switch) is acceptable to the service provider, the processing can complete. Each switch having the same vertex color can be upgraded in parallel.

The vertex weights can be stored in a Heap data structure, a tree, a graph, etc. The highest vertex can then be removed from the heap. The vertex can be colored at step 808. Here, the vertex can be colored with a used color (meaning, a color already allocated to another vertex that is not a neighbor vertex) if possible. If there is a color allocated to another vertex that is not a neighbor node at step 810, then that color can be used at step 812. If there is not a used color allocated to another vertex that is not a neighbor node, then if there is a new color available at step 814, that new color can be used at step 816. If there is no new color available at 814, then the color with the least weight can be chosen and used at 818. If there is a tie, such tie can be broken randomly to select the color.

The steps of coloring the node at 808 can be looped until the heap is empty. Moreover, each color can represent a different stage in the order in which the switches will be upgraded. Vertices with the same color can mean that those switches will be upgraded simultaneously in the same upgrade window. On the other hand, vertices with different colors can be assigned for upgrade during different upgrade windows.

Figure 9:
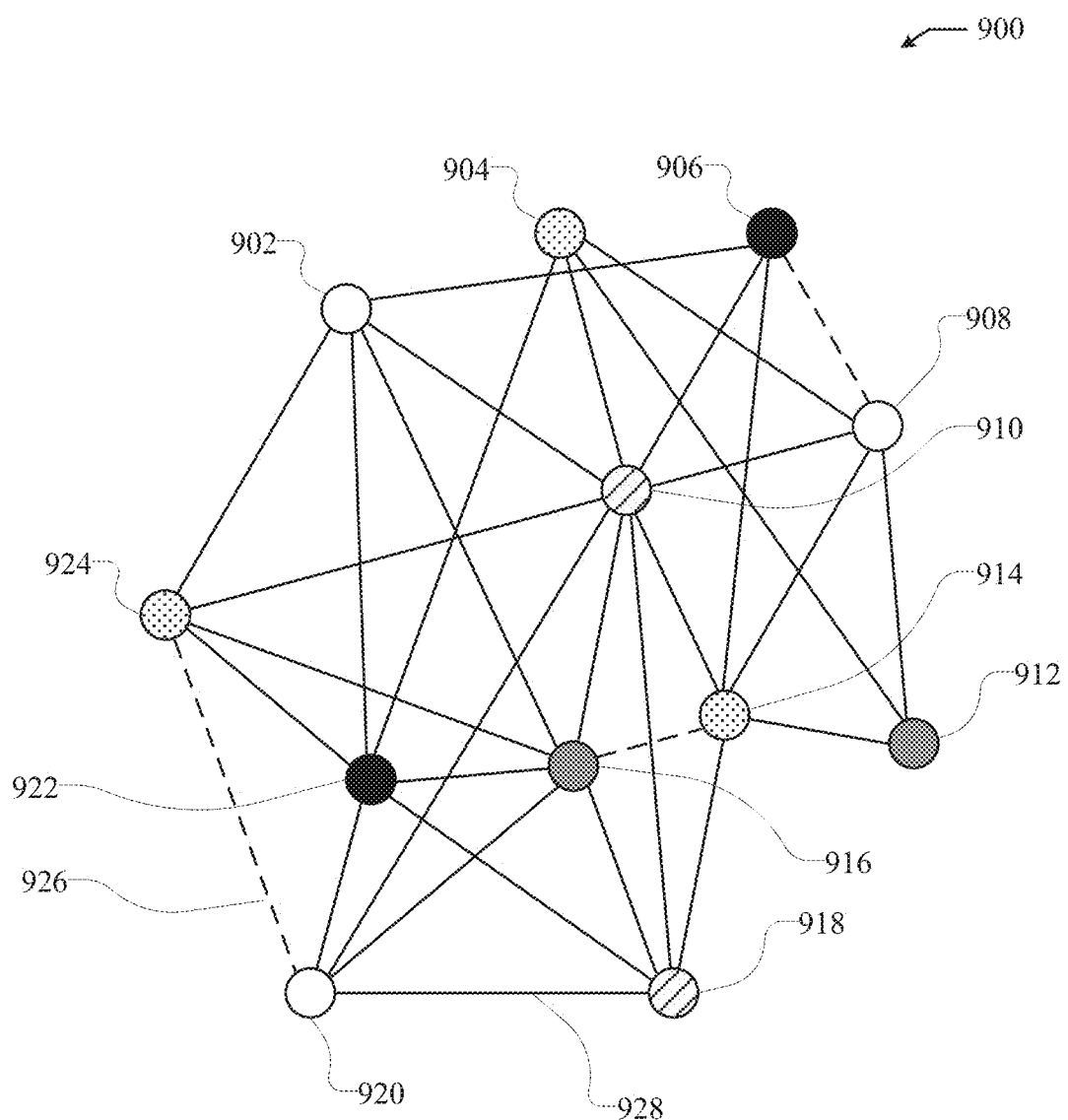
FIG. 9 illustrates an example colored graph showing colored vertices representing switches in a network.

FIG. 9 illustrates an example colored graph 900. The colored graph 900 can be generated by identifying vertices serving a same tenant and coloring the vertices according to a calculated weight or score of the edges of the vertices. The vertices colored similarly can be upgraded in parallel at a same stage. This can ensure that all switches providing service to the same tenants are not upgraded completely at the same time, thus allowing the upgrade of devices for each tenant to be distributed over multiple stages or time windows. This can reduce the upgrade time and tenant impact, while also decreasing upgrade total time.

The colored graph 900 can include vertices 902-924. As illustrated, each of the vertices 902-924 can be colored according to a particular color selected for that vertex. The colors used for the vertices 902-924 can be used to identify stages to upgrade the associated devices represented by the vertices 902-924 based on a multi-stage upgrade schedule. Since neighboring vertices represent vertices that serve the same tenant, these vertices can be colored differently to ensure they are assigned to different stages or time windows in the upgrade schedule. For example, vertex 902 can be colored white while neighboring vertices 904 and 924 can be colored with dotted circles. Moreover, like vertex 902, vertices 908 and 920 can be colored white, and thus can be upgraded at the same upgrade stage or time window as vertex 902, which is also colored white. Similarly, like vertices 904 and 924, vertex 914 can also be colored with dotted circles and thus upgraded in the same stage.

While the colored graph 900 is illustrated using colors and patterns, one of ordinary skill in the art will readily recognize that other characteristics, including other colors and patterns, can be implemented to depict varying stages for upgrading vertices in a graph. For example, the vertices can be labeled using numbers or symbols to depict varying stages, instead of, or in addition to, coloring the vertices. The colors and patterns illustrated in graph 900 are non-limiting examples for illustration purposes.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method comprising:
defining a distribution of at least a portion of switches in a network via a graph, the graph configured to display the portion of switches via a plurality of vertices;
determining a weight of each of the vertices;
selecting, based on weight, an unmarked one of the plurality of vertices having a maximum weight of remaining unmarked vertices;
determining whether a graphical attribute is allocated to an indirectly connected one of the plurality of vertices to the unmarked one of the plurality of vertices;
when the graphical attribute is allocated to the indirectly connected one of the plurality of vertices, applying the graphical attribute to the unmarked one of the plurality of vertices; and
when the graphical attribute is not allocated to the indirectly connected one of the plurality of vertices:
determining if a new graphic attribute is available for allocation to the unmarked one of the plurality of vertices;
in response to the new graphic attribute being available, marking the unmarked one of the plurality of vertices with the new graphic attribute;
in response to the new graphic attribute being unavailable, marking the unmarked one of the plurality of vertices with an existing graphic attribute of another of the plurality of vertices;
returning to the selecting until there are no unmarked vertices in the plurality of vertices;
upgrading a plurality of the switches in a plurality of sequential stages, each of the plurality of sequential stages including a grouping of one or more of the plurality of the switches having a same graphical attribute in a same stage, the grouping of the one or more of the plurality of the switches upgraded in parallel during the same stage, the grouping of the one or more of the plurality of the switches servicing a same tenant.

2. The method of claim 1, further comprising:
scheduling an upgrade of a plurality of the switches in the plurality of sequential stages, wherein the plurality of sequential stages scheduled for upgrading the plurality of the switches represented by identical ones of indirectly connected ones of the plurality of vertices.

3. The method of claim 2, wherein the identical ones include a same color, a same shading, or at least one of a same shape, a same size, or a same graphical attribute.

4. The method of claim 1, wherein each of the plurality of sequential stages is associated with a different graphical attribute having at least one of a different color or a different shading.

5. The method of claim 1, further comprising:
wherein the plurality of sequential stages include a sequence defined by at least one of a plurality of different colors or one of a plurality of different shadings.

6. The method of claim 1, wherein each of the switches servicing a same tenant are represented by vertices having a different graphical attribute to cause each of the switches to be upgraded during different stages.

7. The method of claim 1, wherein any of the switches servicing different tenants are represented by vertices having a same graphical attribute to cause each of the switches to be upgraded during a same stage.

8. The method of claim 1, wherein the graphical attribute represents one of a plurality of service relationships between the switches and tenants in the network and represent estimated disruption levels resulting from a simultaneous upgrade of associated ones of the switches.

9. The method of claim 1, wherein, the plurality of sequential stages are prioritized based on estimated disruption levels, each of the plurality of the switches are assigned scores calculated based on the estimated disruption levels, and the plurality of the switches are associated with the attributes based on the scores.

10. A system comprising:
a processor; and a computer-readable storage medium having stored therein instructions which, when executed by the processor, cause the processor to perform operations comprising:

defining a distribution of at least a portion of switches in a network via a graph, the graph configured to display the portion of switches via a plurality of vertices;

determining a weight of each of the vertices; selecting, based on weight, an unmarked one of the plurality of vertices having a maximum weight of remaining unmarked vertices;

determining whether a graphical attribute is allocated to an indirectly connected one of the plurality of vertices to the unmarked one of the plurality of vertices; when the graphical attribute is allocated to the indirectly connected one of the plurality of vertices, applying the graphical attribute to the unmarked one of the plurality of vertices; and when the graphical attribute is not allocated to the indirectly connected one of the plurality of vertices:

determining if a new graphic attribute is available for allocation to the unmarked one of the plurality of vertices;

in response to the new graphic attribute being available, marking the unmarked one of the plurality of vertices with the new graphic attribute;

in response to the new graphic attribute being unavailable, marking the unmarked one of the plurality of vertices with an existing graphic attribute of another of the plurality of vertices;

returning to the selecting until there are no unmarked vertices in the plurality of vertices, upgrading a plurality of the switches in a plurality of stages, each of the plurality of stages including a grouping of one or more of the plurality of the switches having a same graphical attribute in a same stage, the grouping of the one or more of the plurality of the switches upgraded in parallel during the same stage, the grouping of the one or more of the plurality of the switches servicing a same tenant.

11. The system of claim 10, wherein the plurality of stages are prioritized based on estimated disruption levels.

12. The system of claim 11, wherein each of the plurality of the switches are assigned scores calculated based on the estimated disruption levels.

13. The system of claim 12, wherein the plurality of the switches are associated with attributes based on the scores.

14. The system of claim 10, wherein, each of the switches servicing a same tenant are represented by vertices having a different graphical attribute to cause each of the switches servicing the same tenant to be upgraded during different, and each of the switches servicing different tenants are represented by vertices having a same graphical attribute to cause each of the switches servicing the different tenants to be upgraded during a same stage.

15. A non-transitory computer-readable storage medium having stored therein instructions which, when executed by a processor, cause the processor to perform operations comprising:

defining a distribution of at least a portion of switches in a network via a graph, the graph configured to display the portion of switches via a plurality of vertices;

determining a weight of each of the vertices, selecting, based on weight, an unmarked one of the plurality of vertices having a maximum weight of remaining unmarked vertices;

determining whether a graphical attribute is allocated to an indirectly connected one of the plurality of vertices to the unmarked one of the plurality of vertices;

when the graphical attribute is allocated to the indirectly connected one of the plurality of vertices, applying the graphical attribute to the unmarked one of the plurality of vertices; and when the graphical attribute is not allocated to the indirectly connected one of the plurality of vertices:

determining if a new graphic attribute is available for allocation to the unmarked one of the plurality of vertices;

in response to the new graphic attribute being available, marking the unmarked one of the plurality of vertices with the new graphic attribute;

in response to the new graphic attribute being unavailable, marking the unmarked one of the plurality of vertices with an existing graphic attribute of another of the plurality of vertices;

returning to the selecting until there are no unmarked vertices in the plurality of vertices;

initiate an upgrade of a plurality of the switches in a plurality of stages, each of the plurality of stages including a grouping of one or more of the plurality of the switches having a same graphical attribute in a same stage, the grouping of the one or more of the plurality of the switches upgraded in parallel during the same stage, the grouping of the one or more of the plurality of the switches servicing a same tenant.

16. The non-transitory computer-readable storage medium of claim 15, wherein, the network comprises a multi-tenant network, and the switches include at least one of a top-of-rack switch, a leaf switch, an aggregation switch, an edge device, a tunnel endpoint, or a virtual switch.

17. The non-transitory computer-readable storage medium of claim 15, wherein the graphical attribute includes at least one of a color or a shading, and at least one of a line weight, a shape, a size, a symbol, a number, a character, or a format.

* * * * *